United States Patent [19]

Hass et al.

[11] Patent Number: 6,115,232
[45] Date of Patent: Sep. 5, 2000

[54] METHOD FOR FORMING AN ION IMPLANTED ELECTROSTATIC CHUCK

[75] Inventors: Crystal J. Hass, Colorado Springs; Patrick J. Kelleher, Larkspur, both of Colo.

[73] Assignee: LSI Logic Corporation, Milpitas, Calif.

[21] Appl. No.: 09/204,815

[22] Filed: Dec. 3, 1998

[51] Int. Cl.[7] .................................................. H02N 13/00
[52] U.S. Cl. ........................ 361/234; 279/128; 428/195
[58] Field of Search ................................. 428/195, 209; 361/234; 279/128

[56] References Cited

U.S. PATENT DOCUMENTS

| | | | |
|---|---|---|---|
| 4,004,955 | 1/1977 | Dost et al. | 156/3 |
| 4,480,284 | 10/1984 | Tojo et al. | 361/234 |
| 4,502,094 | 2/1985 | Lewin et al. | 361/234 |
| 4,665,463 | 5/1987 | Ward et al. | 361/234 |
| 5,099,571 | 3/1992 | Logan et al. | 29/825 |
| 5,539,609 | 7/1996 | Collins et al. | 361/234 |
| 5,600,530 | 2/1997 | Smith | 361/234 |
| 5,606,484 | 2/1997 | Kawada et al. | 361/234 |
| 5,606,485 | 2/1997 | Shamouilian et al. | 361/234 |
| 5,607,541 | 3/1997 | Kubota et al. | 156/538 |
| 5,645,921 | 7/1997 | Matsunaga et al. | 428/209 |
| 5,656,093 | 8/1997 | Burkhart et al. | 118/728 |
| 5,671,117 | 9/1997 | Sherstinsky et al. | 367/234 |
| 5,745,331 | 4/1998 | Shamouilian et al. | 361/234 |
| 5,745,332 | 4/1998 | Burkhart et al. | 361/234 |

*Primary Examiner*—Ronald W. Leja

[57] ABSTRACT

The present invention provides a method for forming an electrostatic chuck. A chuck body is provided in which the chuck body includes an insulating layer. Metal is implanted into a surface of the chuck body, wherein a conductive layer of metal is formed within the insulating layer of the chuck body.

28 Claims, 3 Drawing Sheets

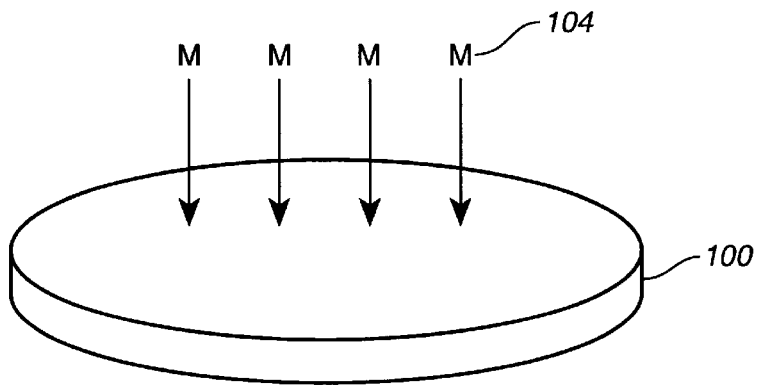
FIG._1
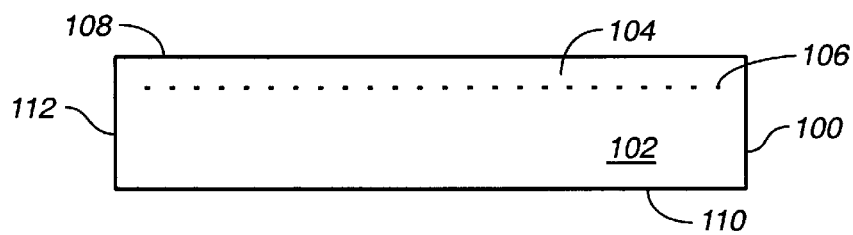
FIG._2
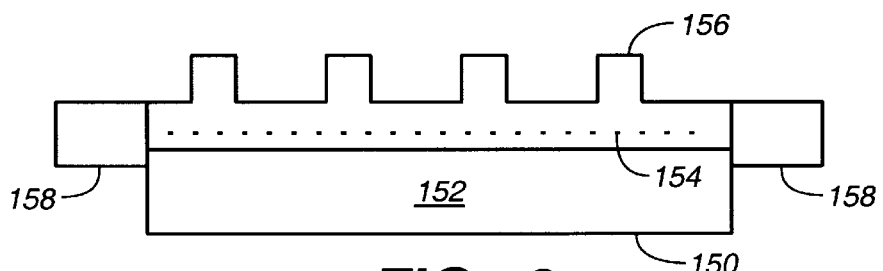
FIG._3
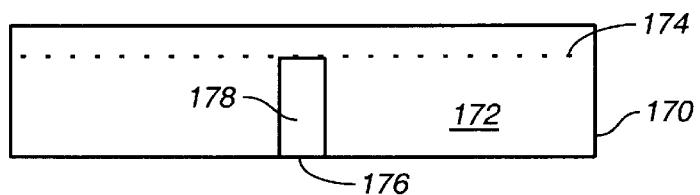
FIG._4

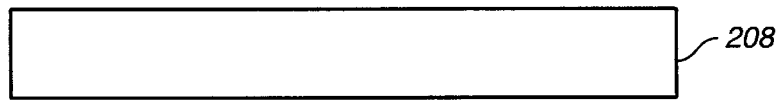
FIG._5A
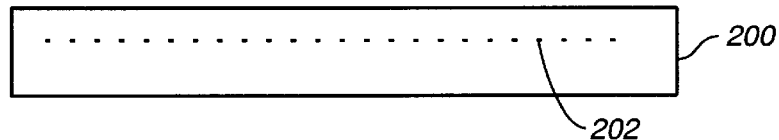
FIG._5B
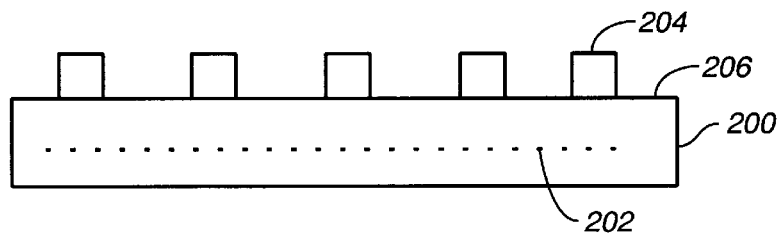
FIG._5C
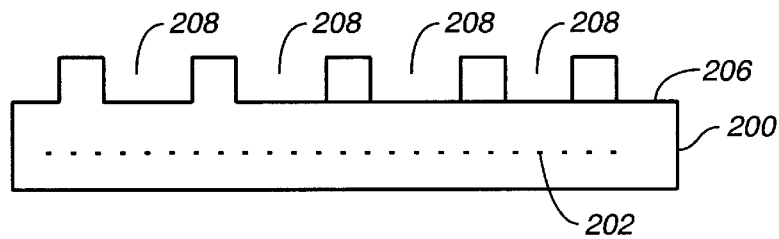
FIG._5D
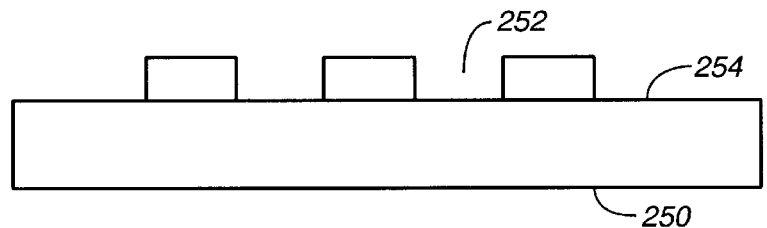
FIG._6A
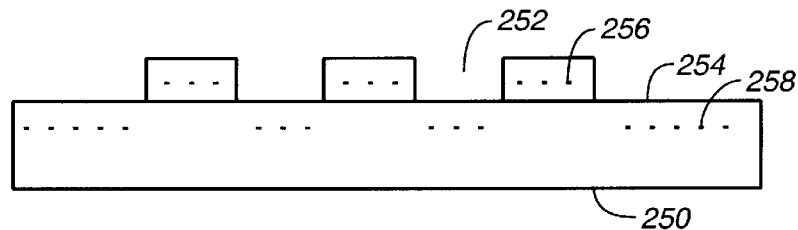
FIG._6B

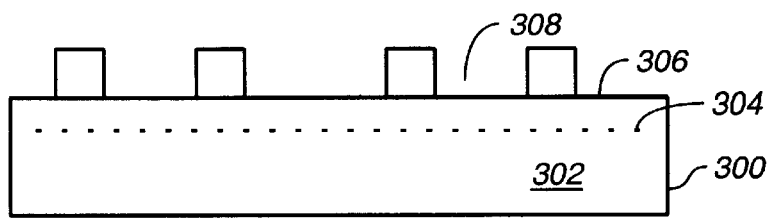
FIG._7A
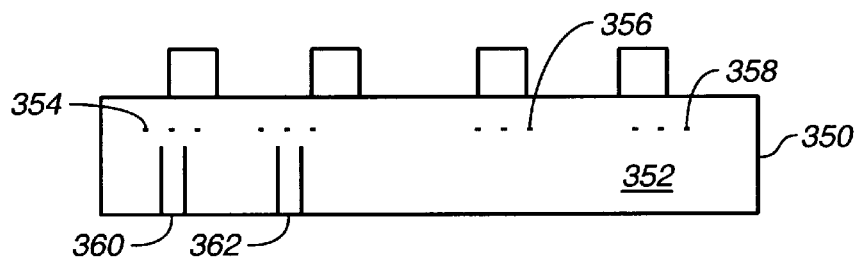
FIG._8A
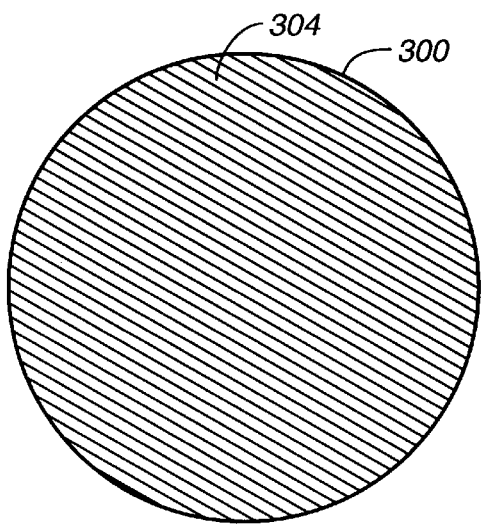
FIG._7B
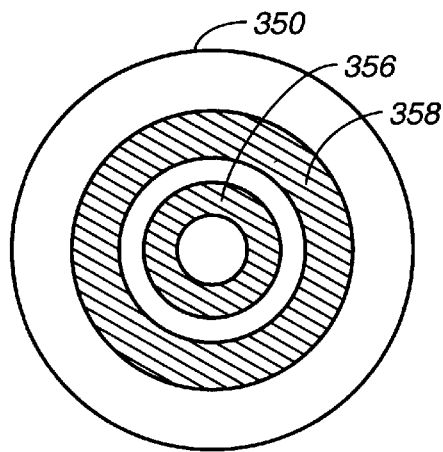
FIG._8B

METHOD FOR FORMING AN ION IMPLANTED ELECTROSTATIC CHUCK

BACKGROUND OF THE INVENTION

1. Technical Field

The present invention relates generally to semiconductor fabrication equipment and in particular to a chuck used to secure semiconductor wafers. Still more particularly, the present invention relates to an electrostatic chuck used to secure semiconductor wafers.

2. Description of the Related Art

In the manufacturing process of electronic devices such as semiconductor devices based on silicon wafers, liquid crystal display panels and the like that various processing steps such as etching, ion-implantation and the like are conducted under dry conditions since high productivity by automatization can be obtained by these dry processes easily as compared with traditional wet processes. One characteristic in these dry processes is that the treatment of the articles is performed in an atmosphere of high vacuum. Further, devices having a larger and larger size and finer and finer patterning with precision for an increased density of circuit integration are required in the modern electronic industry.

Needless to say, the material under processing, e.g., semiconductor silicon wafers, glass substrate plates and the like, in such a processing treatment must be held or transported by some chucking means. One of the conventional chucking devices used for such a purpose is a vacuum chuck using a chucking plate having perforations and connected to an evacuation means so as to attract the work piece by sucking action. In principle, such a vacuum chuck cannot be used in a vacuum atmosphere because of the absence of any pressure difference between the surfaces of the work piece. Even as a chucking means used under normal pressure, vacuum chucks have a problem that the attractive force by suction is localized on and around the perforations in the chucking plate so that a local strain is caused in the work piece under working chucked thereby resulting in a decreased accuracy of alignment of the work piece for processing. Accordingly, vacuum chucks are considered to be unsuitable for use in the manufacturing process of electronic devices due to this serious problem.

Electrostatic chucks are used for holding a workpiece in various application ranging from holding a sheet of paper in a computer graphics plotter to holding a semiconductor wafer within a semiconductor processing system. Although electrostatic chucks vary in design, they all are based on the principal of applying voltage to one or more electrodes in the chuck so as to induce opposite polarity charges in the workpiece and electrodes, respectively. The electrostatic attractive force between the opposite charges presses the workpiece against the chuck, thereby retaining the workpiece.

In semiconductor wafer processing equipment, electrostatic chucks are used for clamping wafers to a support pedestal during processing. The support pedestal may form an electrode as well as a heat sink or source. Such support pedestals are used in etching processes as well as chemical vapor deposition (CVD) or physical vapor deposition (PVD) applications.

More specifically, the electrostatic chuck contains a chuck body formed of a layer of dielectric material covering a conductive pedestal base. In a unipolar or monopolar electrostatic chuck, a voltage is applied to the conductive reference. The wafer is retained by coulomb force between charge accumulated on the underside of the wafer and the voltage applied to the pedestal base.

Typically, these electrostatic chucks are manufactured by adhering an insulating layer on a metal layer. This process is time consuming and is repeated when the insulating layer wears off during processing of semiconductor devices. Therefore, it would be advantageous to have an improved method for manufacturing electrostatic chucks.

SUMMARY OF THE INVENTION

The present invention provides a method for forming an electrostatic chuck. A chuck body, including an insulating layer, is provided. Metal is implanted into a surface of the chuck body, wherein a conductive layer of metal is formed within the insulating layer of the chuck body.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram of an electrostatic chuck in accordance with a preferred embodiment of the present invention;

FIG. 2 is a cross sectional view of an electrostatic chuck in accordance with a preferred embodiment of the present invention;

FIG. 3 is an electrostatic chuck using a ring connection in accordance with a preferred embodiment of the present invention;

FIG. 4 is a cross section illustrating an inside connection in an electrostatic chuck in accordance with a preferred embodiment of the present invention;

FIGS. 5A–5D are cross sectional diagrams illustrating a process for manufacturing an electrostatic chuck in accordance with a preferred embodiment of the present invention;

FIGS. 6A and 6B are cross sections of a chuck body illustrating a process for creating an electrostatic chuck in accordance with a preferred embodiment of the present invention;

FIGS. 7A and 7B are illustrations of a monopolar electrostatic chuck in accordance with a preferred embodiment of the present invention;

FIGS. 8A and 8B are diagrams illustrating a bipolar chuck in accordance with a preferred embodiment of the present invention.

DETAILED DESCRIPTION

With reference now to figures and in particular with reference to FIG. 1, a diagram of an electrostatic chuck is depicted in accordance with a preferred embodiment of the present invention. Electrostatic chuck 100 is made from a chuck body 102, which is a plate of an insulating material, such as $SiO_2$ in the depicted example. A dose of metal 104 is implanted into chuck body 102 with a high-energy implant. In the depicted example, a high-energy implant is an implant using greater than or equal to 10E6 eV.

Turning now to FIG. 2, a cross sectional view of an electrostatic chuck 100 is depicted in accordance with a preferred embodiment of the present invention. Electrostatic chuck 100 includes a conductive layer 106 formed from metal 104 being implanted into chuck body 102. In the depicted example, conductive layer 106 is located one or more μm below the surface 108 of chuck body 102. In this example, conductive layer 106 has been implanted below the surface of the insulator in chuck body 102. Electrical connection for electrostatic chuck 100 may be made in a number of ways. For example, electrical connection to conductive layer 106 may be made by drilling a hole through surface 110 or by connection to outer edge 112. Connection may be made through various mechanisms, such as, mechanical, conductive epoxy, or inter-metallic welding. In addition, grooves may be stamped or etched into surface 108 of chuck body prior to implanting metals or after implanting metals into chuck body 102. In the depicted example, these grooves allow helium gas to flow through the grooves during processing of semiconductors. In the depicted example, the grooves are formed through a combination of photolithography and etching steps.

With reference now to FIG. 3, an electrostatic chuck using a ring connection is depicted in accordance with a preferred embodiment of the present invention. Electrostatic chuck 150 includes a chuck body 152, which is an insulating body, containing a conductive layer 154. Chuck body 152 also contains grooves 156, which are used to introduce helium gas beneath a wafer that may be held by electrostatic chuck 150. The helium is used as a cooling gas and grooves 156 are employed in an effort to distribute the cooling gas uniformly across a wafer surface for a wafer held by electrostatic chuck 150. Outer ring 158 is a ring around chuck body 152 used to provide a connection to conductive layer 154.

With reference now to FIG. 4, a cross section illustrating an inside connection in an electrostatic chuck is depicted in accordance with a preferred embodiment of the present invention. Electrostatic chuck 170 is formed from a chuck body 172 in which chuck body 172 is a body of insulating material, such as $SiO_2$. Conductive layer 174 is formed through the implantation of metal into chuck body 172. The inside connection, also referred to as a "backside connection", is made to conductive layer 174 through opening or hole 176. Opening 176 is either drilled or etched into chuck body 172 such that metal 178 or some other conductive material placed into hole 176 allows electrical connection with conductive layer 174. In the depicted example, hole 176 is etched or drilled such that metal 178 may touch conductive layer 174. FIGS. 5A–5D are cross sectional diagrams illustrating a process for manufacturing an electrostatic chuck in accordance with a preferred embodiment of the present invention. The process begins by obtaining a chuck body 200, which is a substrate in the form of an insulator in FIG. 5A.

Next, metal is implanted into chuck body 200 to form a conductive layer 202 in FIG. 5B. Photoresist 204 is formed on surface 206 of chuck body 200 and patterned as shown in FIG. 5C. Exposed portions of surface 206 are etched. Then photoresist 204 is removed to form grooves 208 as illustrated in FIG. 5D. These grooves are circular grooves in the depicted examples.

With reference now to FIGS. 6A and 6B, cross sections of a chuck body illustrating a process for creating an electrostatic chuck are depicted in accordance with a preferred embodiment of the present invention. In FIG. 6A, chuck body 250 is an insulating body with grooves 252 etched into surface 254. Implantation of metal is then performed to form conductive layer 256 and 258 in chuck body 250. As can be seen in this example, the grooves are formed prior to implantation of metal into chuck body 250. The grooves may be formed within chuck body 250 either mechanically or through various known photolithography and etching techniques.

The present invention may be applied to both monopolar chucks and bipolar chucks. A monopolar chuck is a chuck with a blanket implant on the substrate. With reference now to FIGS. 7A and 7B, illustrations of a monopolar electrostatic chuck are depicted in accordance with a preferred embodiment of the present invention. FIG. 7A is a cross sectional view of electrostatic chuck 300 in which a chuck body 302 is an insulating body with a conductive layer 304 formed through implanting metal into chuck body 302 through surface 306. In the depicted example, grooves 308 have been formed on surface 306 of chuck body 302. In FIG. 7B, a top view of electrostatic chuck 300 is illustrated in which conductive layer 304 is a blanket implant on the substrate, chuck body 302.

With reference next to FIGS. 8A and 8B, diagrams illustrating a bipolar chuck are depicted in accordance with a preferred embodiment of the present invention. Electrostatic chuck 350 includes a chuck body 352 with a conductive layer 354 implanted to form ring 356 and ring 358. These rings are more clearly shown in FIG. 8B. In the depicted example, connection to rings 356 and 358 are made through backside contacts 360 and 362. Backside contact 360 provides a contact to ring 358 while backside contact 362 provides a contact to ring 356. These rings may be formed through a variety of mechanisms including patterning photoresist to blank out areas of implantation. In this manner, rings 356 and 358 may be implanted within chuck body 352. Although the depicted example illustrates two rings, other numbers of rings may be made and other geometries may be used in creating a bipolar electrostatic chuck.

Various metals may be implanted including gold (Au), silver (Ag), copper (Cu), iron (Fe), nickel (Ni), and chromium (Cr). Any transition metals or noble metals may be used in forming the conductive layer in the depicted examples. The doses of metal in the depicted example may range from 1E3 atoms/cm$^2$ to 1E21 atoms/cm$^2$. The conductive layer is formed a depth of one or more micrometers in the depicted examples. The grooves may be made using any sort of known technique including grinding and etching.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for forming an electrostatic chuck comprising:
    providing a chuck body, wherein the chuck body includes an insulating layer; and
    implanting metal into a surface of the chuck body, wherein a conductive layer of metal is formed within and below a surface of the insulating layer.
2. The method of claim 1, further comprising:
    forming grooves in the surface of the chuck body.
3. The method of claim 2, wherein the step of forming grooves in the surface of the chuck body is performed prior to implanting metal into the surface.
4. The method of claim 2, wherein the step of forming grooves in the surface of the chuck body is performed after implanting metal into the surface.

5. The method of claim 1 further comprising: forming a ring connection to provide an electrical contact to the conductive layer.

6. The method of claim 1 further comprising: forming a backside connection to provide electrical contact to the conductive layer.

7. The method of claim 1, wherein the electrostatic chuck is a monopolar electrostatic chuck.

8. The method of claim 1, wherein the electrostatic chuck is a bipolar electrostatic chuck.

9. The method of claim 1, wherein the metal is selected from a group consisting of Au, Ag, Cu, Fe, Ni, and Cr.

10. The method of claim 1, wherein the metal is a transition metal.

11. The method of claim 1, wherein the metal is a noble metal.

12. The method of claim 1, wherein the conductive layer is formed using an implant energy of greater than or equal to 10E6 eV.

13. A method for manufacturing an electrostatic chuck comprising:

implanting metal into a surface of an insulating substrate, wherein a conductive layer of metal is formed beneath the surface of the insulating substrate;

forming a photoresist layer on the surface of the insulating substrate;

patterning the photoresist layer, wherein portions of the surface are exposed; and etching the exposed portions of the surface to form grooves in the insulating substrate.

14. The method of claim 13, wherein the conductive layer is formed using an implant energy of greater than or equal to 10E6 eV.

15. The method of claim 13, wherein the conductive layer of metal is formed about micrometer below the surface of the insulating substrate.

16. The method of claim 13 further comprising:

forming an electrical connection to the conductive layer of metal.

17. The method of claim 16, wherein the surface is a first surface and wherein the insulating substrate has a second surface opposite the first surface and wherein the step of forming an electrical connection comprises:

forming an opening in the second surface, exposing a portion of the conductive layer; and forming an electrical connection to the exposed portion of the conductive layer.

18. The method of claim 13, wherein the electrostatic chuck is a bipolar electrostatic chuck.

19. The method of claim 13, wherein the electrostatic chuck is a monopolar electrostatic chuck.

20. The method of claim 13 further comprising:

forming and patterning a photoresist layer on the surface of the insulating substrate prior implanting metal, wherein cocentric rings are formed in the conductive layer of metal.

21. The method of claim 13, wherein the metal is selected from a group consisting of Au, Ag, Cu, Fe, Ni, and Cr.

22. An electrostatic chuck comprising:

an insulating substrate having a surface; and a conductive layer of implanted metal within the insulating substrate, beneath the surface of the insulating substrate.

23. The eletrostatic chuck of claim 22 further comprising:

grooves formed in the surface of the insulating substrate.

24. The electrostatic chuck of claim 22, wherein the conductive layer of implanted metal includes a metal selected from a group consisting of Au, Ag, Cu, Fe, Ni, and Cr.

25. The electrostatic chuck of claim 22, wherein the electrostatic chuck is a bipolar electrostatic chuck.

26. The electrostatic chuck of claim 22, wherein the electrostatic chuck is a monopolar electrostatic chuck.

27. The electrocstatic chuck of claim 22, wherein the surface is a first surface and wherein the insulating substrate has a second surface opposite the first surface and wherein an opening in the second surface, exposing a portion of the conductive layer, wherein an electrical connection to the portion of the conductive layer is located in the opening.

28. The electrostatic chuck of claim 22, wherein the conductive layer of implanted metal is located about micrometer below the surface of the insulating substrate.

* * * * *